United States Patent
Gahleitner

(10) Patent No.: US 10,669,085 B2
(45) Date of Patent: Jun. 2, 2020

(54) STRIP-SHAPED PLASTIC OBJECT

(71) Applicant: Teufelberger Gesellschaft m.b.H., Wels (AT)

(72) Inventor: Thomas Gahleitner, Krenglbach (AT)

(73) Assignee: Teufelberger Gesellschaft m.b.H., Wels (AT)

( * ) Notice: Subject to any disclaimer, the term of this patent is extended or adjusted under 35 U.S.C. 154(b) by 186 days.

(21) Appl. No.: 16/065,185

(22) PCT Filed: Dec. 23, 2016

(86) PCT No.: PCT/EP2016/082523
§ 371 (c)(1),
(2) Date: Jun. 22, 2018

(87) PCT Pub. No.: WO2017/109158
PCT Pub. Date: Jun. 29, 2017

(65) Prior Publication Data
US 2019/0023467 A1    Jan. 24, 2019

(30) Foreign Application Priority Data

Dec. 23, 2015  (DE) .................. 10 2015 226 675

(51) Int. Cl.
*B65D 63/10*  (2006.01)
*B29C 59/04*  (2006.01)

(52) U.S. Cl.
CPC .......... *B65D 63/1018* (2013.01); *B65D 63/10* (2013.01); *B29C 59/04* (2013.01)

(58) Field of Classification Search
CPC ............................................... B65D 63/1018
(Continued)

(56) References Cited

U.S. PATENT DOCUMENTS

2007/0014971 A1    1/2007 Tajika et al.

FOREIGN PATENT DOCUMENTS

DE    20 2009 016 705 U1    4/2011
EP         1 657 178 A      5/2006
(Continued)

OTHER PUBLICATIONS

Letter of Austrian Patent Attorney to European Patent Office in PCT/EP2016/082523 dated January 18, 2018 with English translation of the relevant parts.
(Continued)

*Primary Examiner* — Samir Shah
*Assistant Examiner* — Tong Guo
(74) *Attorney, Agent, or Firm* — Collard & Roe, P.C.

(57) ABSTRACT

The invention relates to a strip-shaped plastic object (1), having a longitudinal extent (2) and, perpendicular thereto, a strip width (3) and a strip thickness (4), wherein the strip-shaped plastic object (1) comprises an at least partially crystalline, thermoplastic plastic material, which is stretched monoaxially, or predominantly monoaxially, in the direction of the longitudinal extent (2). The strip width (3) and the longitudinal extent (2) form an upper (5) and a lower surface (6), which surfaces (5, 6) are spaced apart from each other by the strip thickness (4), wherein at least one of the surfaces (5, 6) has an embossment (7). The embossment (7) is formed by embossing impressions (8) distributed over the strip width (3) and over the longitudinal extent (2), wherein the embossing impression (8) has a length (9), a width (10), and a depth (11) extending in the direction of the strip thickness (4). In a top view of the embossing impression (8), the boundary line (12) thereof is formed by a closed oval curve.

16 Claims, 2 Drawing Sheets

Figure 2:
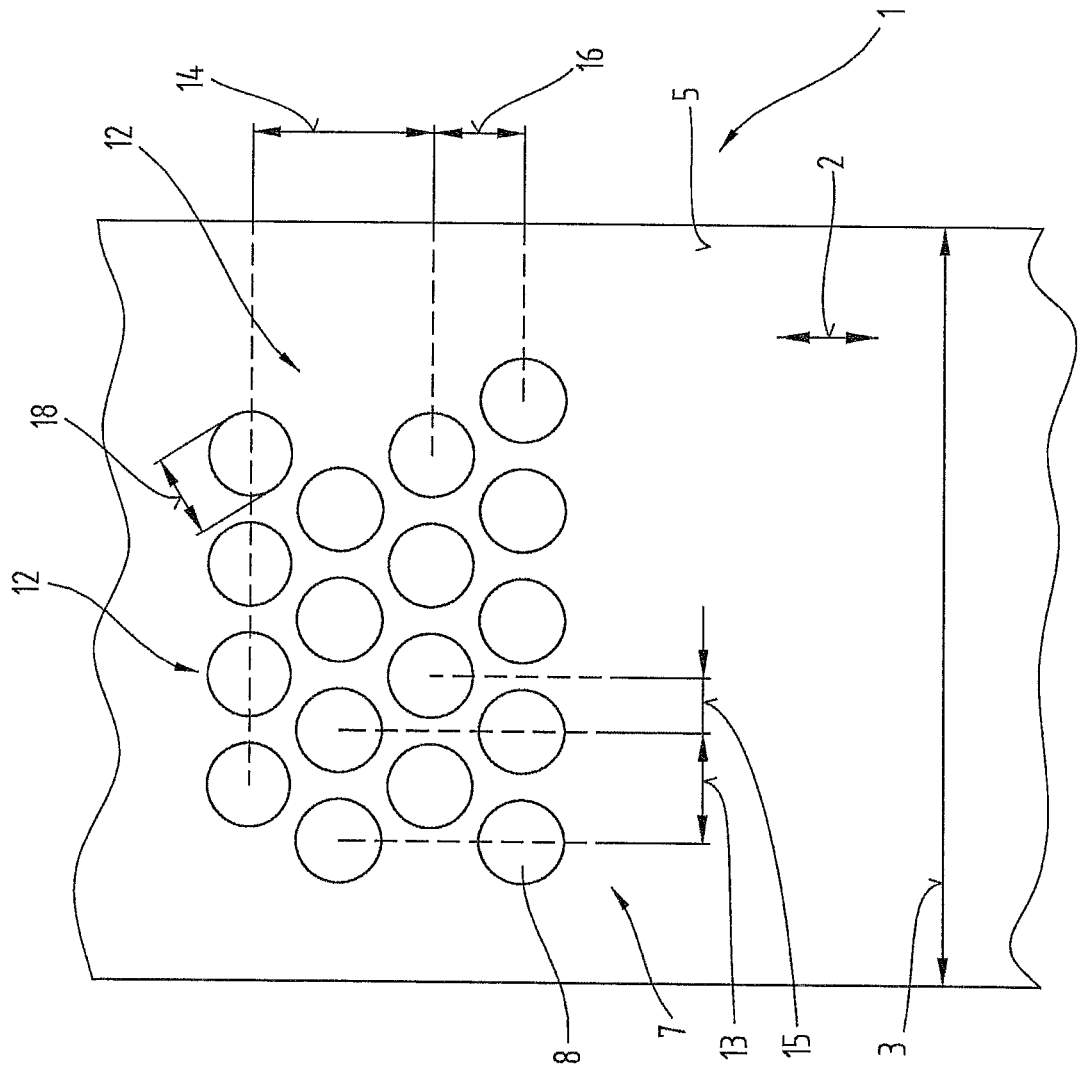

(58) Field of Classification Search
USPC ........................................................ 428/156
See application file for complete search history.

(56) References Cited

FOREIGN PATENT DOCUMENTS

| | | |
|---|---|---|
| JP | S53-115397 A | 10/1978 |
| JP | S63-176140 A | 7/1988 |
| JP | S63-294361 A | 12/1988 |
| JP | H02-166058 A | 6/1990 |
| JP | 3 003 462 U | 10/1994 |
| JP | 3003462 U | 10/1994 |
| JP | H08-217132 A | 8/1996 |
| JP | 2005-001679 A | 1/2005 |
| JP | 2005-015946 A | 1/2005 |
| JP | 2015-110437 A | 6/2015 |

OTHER PUBLICATIONS

English translation of the International Preliminary Report on Patentability in PCT/EP2016/082523 dated Feb. 16, 2018.
International Search Report of PCT/EP2016/082523, dated Mar. 6, 2017.

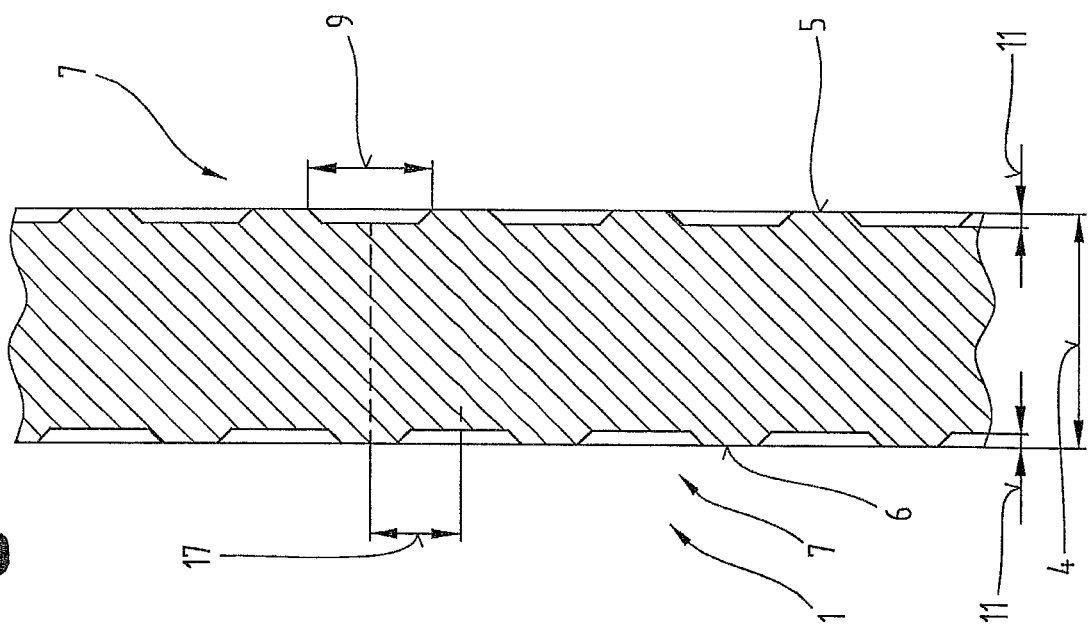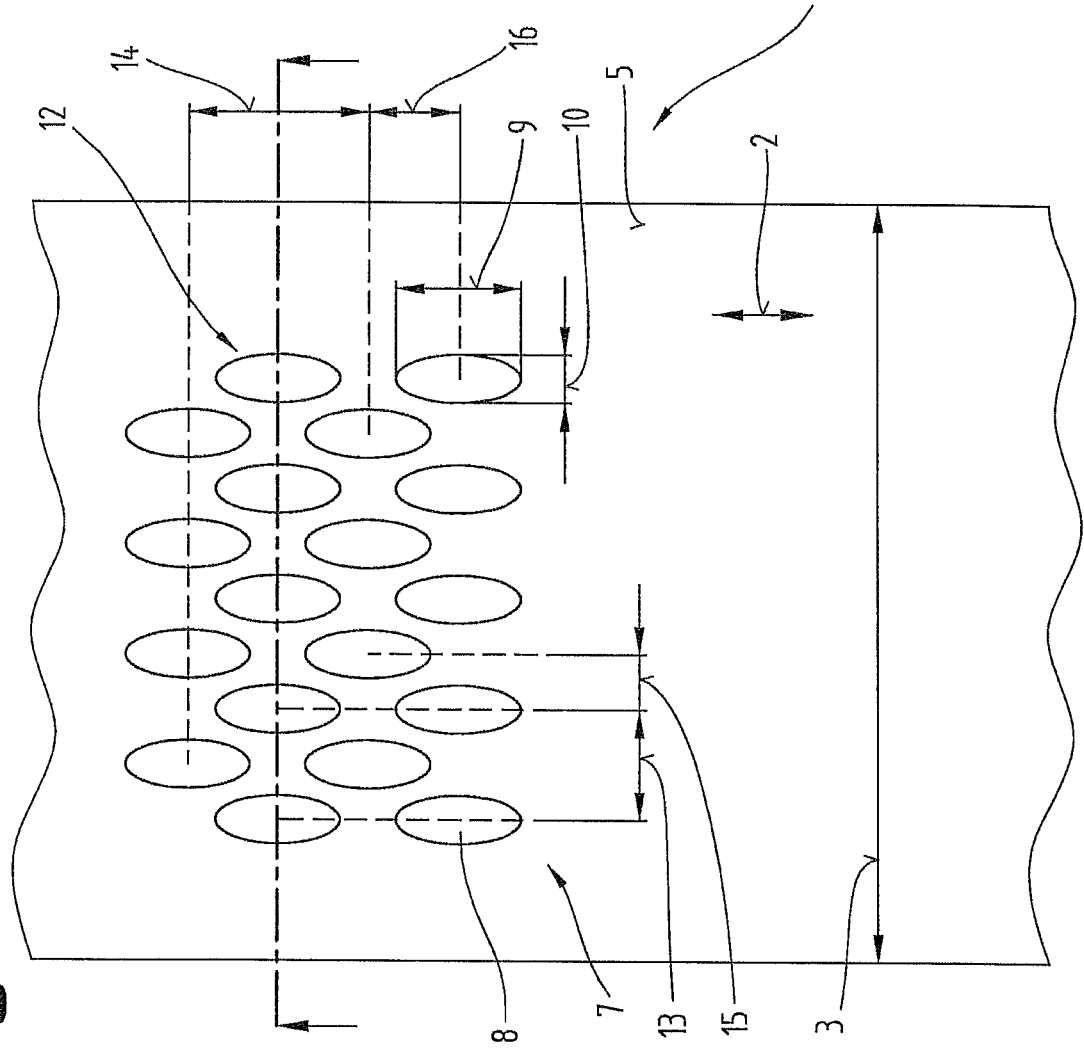

STRIP-SHAPED PLASTIC OBJECT

CROSS REFERENCE TO RELATED APPLICATIONS

This application is the National Stage of PCT/EP2016/082523 filed on Dec. 23, 2016, which claims priority under 35 U.S.C. § 119 of German Application No. 10 2015 226 675.3 filed on Dec. 23, 2015, the disclosure of which is incorporated by reference. The international application under PCT article 21(2) was not published in English.

The invention relates to a strip-shaped plastic object, having a longitudinal extent and, perpendicular thereto, a strip width and a strip thickness.

The strip-shaped plastic object according to the invention is also referred to as a strip or plastic strip, the description of features being transferred accordingly without restriction.

When packing or securing goods on a means of transport, such as, for example, a pallet, metal strips were often used in former times as these were able to absorb the necessary clamping or retaining forces. In the meantime, it is now possible to create a strip-shaped plastic object using plastic strips stretched monoaxially, or predominantly monoaxially, made from an at least partially crystalline, thermoplastic plastic material, said object being able to fulfill the above-mentioned requirements. In particular, tensile strength values which are equal to those achieved with metal strips, or which exceed the tensile strength of metal strips in some cases, can now be achieved with such plastic strips. Unlike metal strips, where a closing clip is usually used to secure a strap, plastic strips are usually joined by friction welding or hot wedge welding. In the case of friction welding, the strips to be joined are pressed onto one another and moved against one another, causing the strip surfaces to heat up until the material softens and they are fused together due to the applied pressure. In hot wedge welding, the surfaces of the two ends of the strip to be connected are brought to melting point by means of a heated metal wedge and then pressed onto one another until they are joined together.

Due to the manufacturing stages when stretching the plastic strip, this will have a very flat and in particular, an especially smooth surface. However, with respect to the necessary clamping of the plastic strip and the subsequent welding process, this is disadvantageous, as a smooth surface can cause slipping between the clamping and/or welding tool respectively and the strip, with the result that the necessary clamping force may not be achieved, and the welding process is not performed correctly.

It would therefore be advantageous if the strip surface had a structure with the advantageous property of permitting a force to be applied to the strip by a clamping or welding device respectively without any risk of slipping.

JP S63176140 A describes a plastic strip which is stretched and wherein a specific surface roughness is applied. This roughness is formed by cross grooves running across the entire strip width, wherein the patent document specifically discloses the fact that this embossment affects all layers of the strip. An angular embossment of this kind, which extends over the entire width and the entire thickness of the strip, has the disadvantage that the microcrystalline structure of the plastic material is damaged by this process, thus leading to weaknesses in the plastic strip, and causing its tensile strength to be reduced accordingly.

JP 2005-001679A describes the use of a rhomboid embossing pattern to increase the flexibility of the strip. However, an embossing pattern of this kind has the disadvantage that, in addition to damaging the material, the deep embossing process also creates a notched effect due to the tip of the rhombus, which can lead to the strip tearing or splintering under stress. A tapered embossing pattern of this kind also has the disadvantage that a roller on a clamping and welding device may not be able to transfer the required force to the entire strip, as contact between the roller and the embossing pattern will be reduced in the region of the tip of the rhombus, thus reducing the surface area for force transference. This can also lead to force peaks in this region, which encourage tearing or splintering.

The disadvantages of the known prior art include the fact that it leads to a large-scale structural change or deformation of the strip and thus the stretched plastic material, or the available embossing pattern can only be used for force transference purposes on part of the embossing surface. It is thus possible that the unnecessarily high tensile or welding forces required may cause the plastic strip to display reduced mechanical strength at precisely those weak points introduced by the embossing process, and thus lead to the opportunity for damage and for tearing, in particular.

The object of the invention is therefore to create a strip-shaped plastic object such as to ensure optimum force transference from a drawing or welding device to the strip, wherein the mechanical properties of the plastic strip remain as intact as possible.

The object of the invention is achieved by a strip-shaped plastic object having a longitudinal extent and, perpendicular thereto, a strip width and a strip thickness. The strip-shaped plastic object comprises an at least partially crystalline, thermoplastic plastic material, which is stretched monoaxially, or predominantly monoaxially, in the direction of the longitudinal extent, and wherein the strip width and the longitudinal extent form an upper and a lower surface, which surfaces are spaced apart from each other by the strip thickness. At least one of the surfaces has an embossment, wherein the embossment is formed by embossing impressions distributed over the strip width and over the longitudinal extent. The embossing impression also has a length, a width, and a depth extending in the direction of the strip thickness. In a top view of the embossing impression, the boundary line thereof is formed by a closed oval curve.

Polyesters, in particular PET or PBT, polyolefins such as PP or PE, or even polyamides may, for example, be used as the thermoplastic, at least partially crystalline plastic material. In principle, copolymers, and so-called biopolymers, or even blends of different polymers may also be used. Additives or fillers may also be added to the plastic material. The advantage of this material is that it possesses deformability and, in particular, stretchability in the heated state, but it also displays very high mechanical strength in the cooled state.

The strip-shaped object according to the invention may, for example, be used to secure goods circumferentially. In this process, it is usually necessary to apply a clamping force to the strip to fix the goods securely. In this respect, an embossing impression with a closed oval boundary line has the advantage that force is transferred as uniformly as possible from a clamping or sealing device to the strip-shaped object. This is particularly advantageous in that, in some cases, very high clamping forces need to be transferred from the clamping or sealing device to the strip via a very small surface portion. This design is also advantageous with respect to welding the circumferential strip which is superimposed in the joining area by means of friction welding, as it prevents catching and thus ensures that the welding process can be performed more quickly. In particular, the softening state is achieved sooner. In the case of embossing impressions with straight boundary lines, straight portions or the transitions between straight portions may catch on each other, which can lead to an increased use of force in a clamping process and in the welding process.

In a development of the invention, the boundary line of the embossing impression is designed to be elliptical or oval. Boundary lines of this kind have the advantage that they permit particularly good force transference, as a compression element of a clamping or sealing device, for example a roller, can establish particularly good contact with the boundary line. In particular, this prevents local force peaks.

According to another development of the invention, it is conceivable for the length to be in the region of 1.0 mm-2.8 mm and the width to be in the region of 0.5 mm-1.2 mm, wherein the combinations 2.0×0.84 mm, or 1.25×0.52 mm, or 2.5×1.05 mm respectively are preferred.

In yet another development of the invention, the boundary line of the embossing impression is designed to be circular. The advantage of a circular shape is that it is symmetrical with respect to the longitudinal extent or strip width, and thus has no preferred orientation.

According to another development of the invention, it is conceivable for the diameter of the embossing impression to be in the region of 0.8 mm-1.6 mm, but the diameter is preferably 0.89 mm or 1.42 mm.

In another development of the invention, it is conceivable for the length of the embossing impression to be oriented in the direction of the longitudinal extent and the width of the embossing impression to be oriented in the direction of the strip width. This has the advantage that the preferred orientation is aligned in the direction of the tensile or retaining forces to be transferred.

Another development of the invention entails the distributed embossing impressions of the embossments forming columns in the direction of the longitudinal extent and rows in the direction of the strip width. This leads to a regular arrangement of the embossing impressions on the surface.

Yet another development may also entail the orientation of the columns being pivoted by an angle in relation to the longitudinal extent and/or the orientation of the rows being pivoted by an angle in relation to the strip width. The embossment should guarantee optimum transference of forces both during clamping and during the welding process. A high energy level needs to be transferred in a very short time, particularly during the welding process, in order to soften the two strip surfaces lying on top of another. To this end, pivoting accordingly may have the advantage of ensuring slightly higher force transference across the longitudinal extent and thus reducing the time taken for the plastic material to soften during friction welding.

Other embodiments also entail providing row spacing between two consecutively arranged embossing impressions, this spacing being 2 to 2.5 times the length of the embossing impression, when viewed in the longitudinal extent, and providing column spacing between two adjacently arranged embossing impressions which is less than or equal to twice the width of the embossing impression when viewed in the strip width.

According to one development, it is conceivable to have a column offset and a row offset between consecutively arranged rows, when viewed in the longitudinal extent, and in particular, for the column offset to be 50% of the column spacing and the row offset to be 50% of the row spacing. A more compact arrangement of the embossing impressions is achieved by use of a column or row offset. It is particularly advantageous to have an offset of 50% in each case, as this ensures an optimum compact arrangement of the embossing impressions. In this case, the adjacently arranged embossing impressions in a subsequent row are arranged precisely in the spaces between the adjacently arranged embossing impressions in the previous row.

According to another development, the depth of the embossing impression is in the region of 50 µm-300 µm, and in particular 150 µm. As a plastic according to the invention is substantially not compressible or only very slightly compressible, the material is displaced by the downwards pressure of the embossing stamp during the embossing process. An excessively high embossing pressure can, in some cases, damage the plastic material, and may also lead to an increase in mechanical effort, and thus production costs due to high embossing pressures, with the result that an embossing depth of 300 µm can be achieved by applying an appropriate maximum pressure. The preferred embossing depth is 150 µm. However, it is also possible to use flat embossing, in which case the depth of the embossing impression is in the region of just a few µm, flat embossing usually being used to create surface patterns.

In another development, both surfaces have an embossment. For the purpose of further mechanical processing or application, it can be advantageous if it is possible to ensure that an embossed surface is always oriented towards the working area without checking the orientation. It can also be advantageous for the welding process if two embossed surfaces are welded together. Use of a friction welding method is preferred, which, according to the development of the invention, has the advantage that the applied energy is distributed over a smaller surface area, causing the material to soften more quickly, and thus leading to lower energy requirements overall.

According to one embodiment, it is conceivable for the embossment to be different on both surfaces, in particular by the respective embossing impressions of both embossments having a different boundary line. If the plastic object according to the invention is used to secure goods, it will be subject to two requirements. Firstly, the embossment must guarantee the best possible force transference from the clamping or sealing device to the strip, wherein the direction of force will act to as great an extent as possible in the direction of the longitudinal extent. Secondly, the friction motion during welding will also have motion components that deviate from the longitudinal direction. This development is able to ensure that one strip surface has an optimized embossment for the clamping process, and the other strip surface has an optimized embossment for the welding process. This development is also able to mitigate any structural weakening of the plastic caused by the embossing process.

According to another development, in the top view of the strip-shaped plastic object, an offset is provided in the direction of the longitudinal extent and/or an offset in the direction of the strip width between the embossment on both surfaces. This development may be advantageous with regard to transferring forces from the clamping or sealing device onto the plastic strip. However, as an embossment or the individual embossing impression also indicate a structural weakness, this development ensures that structural weak spots are not directly on top of one another. For the sake of completeness, however, it should be noted that an arrangement with no offset is also conceivable if this is expedient for the proposed application.

A further advantageous embodiment entails the offset being 50% of the column spacing and/or 50% of the row spacing.

According to one development, it is conceivable for the orientation of both embossments to be pivoted by an angle in relation to one another, in particular by 90°, when viewed in the top view of the strip-shaped plastic object. As described above, it is thus possible to create an embossment that is optimized to the respective surface application.

Another development of the previous embodiment entails the angle being 90° and the embossing impressions of both embossments being designed such that, if both embossments are arranged without pivoting, they coincide with respect to their length and width, and/or width and diameter respectively. In particular, this means that two adjacently arranged embossing impressions, in other words two widths, the span between the embossing impressions, and one half-span on either side of the widths, correspond to the length and one half-span on either side of the length, of the embossing impression.

According to one development, it is also conceivable that the boundary line may be made up of straight sections and/or different curve radii.

To facilitate understanding of the invention, it is explained below in greater detail with the aid of the following figures, which show highly simplified schematic representations of:

FIG. 1a) and b) a possible embodiment of the strip-shaped plastic object according to the invention with an oval embossment, in a top view and in a sectional view;

FIG. 2 another possible embodiment with a circular embossment.

FIG. 1 shows the strip-shaped plastic object 1 according to the invention, first in a top view (FIG. 1a) and then as a sectional view (FIG. 1b). The plastic object 1 comprises a longitudinal extent 2 and, perpendicular thereto, a strip width 3 and a strip thickness 4. The strip width 3 and the longitudinal extent 2 form an upper 5 and a lower 6 surface, which surfaces 5, 6 are spaced apart from each other by the strip thickness (4).

One of the surfaces 5, 6 has an embossment 7, said embossment 7 being formed by embossing impressions 8 distributed over the strip width 3 and over the longitudinal extent 2. An embossing impression 8 has a length 9, a width 10, and a depth 11 extending in the direction of the strip thickness 4. In a top view of the embossing impression 8, the boundary line 12 thereof is formed by a closed oval curve, wherein the boundary line 12 is designed to be elliptical or oval according to a first embodiment. According to one embodiment, the length 9 is in the region of 1 mm to 2.8 mm and the width 10 is in the region of 0.5 mm to 1.2 mm. More preferable variations have a length of 1.25 mm and a width of 0.52 mm, or a length of 2 mm and a width of 0.84 mm, or a length of 2.5 mm and a width of 1.05 mm respectively. It is preferable if the distributed embossing impressions 8 of the embossment 7 are arranged in columns in the direction of the longitudinal extent 2 and in rows in the direction of the strip width 3, wherein there is a column spacing 13 between the columns and a row spacing 14 between the rows. According to the preferred embodiments, the combination of column spacing and row spacing is 0.83/2.63 mm and 1.54/4.50 mm.

In particular, the column spacing 13 is less than or equal to twice the width 10 of the embossing impression 8. The row spacing 14 is in the region of 2 to 2.5 times the length 9 of the embossing impression 8.

To ensure that the embossing impressions 8 are packed as compactly as possible to form the embossment 7, it is proposed that adjacently arranged columns of a row are arranged with a column offset 15, and adjacently arranged rows of a column are arranged with a row offset 16. The column offset 15 is preferably 50% of the column spacing 13 and the row offset 16 is preferably 50% of the row spacing 14.

It is explicitly noted that the embossment is only shown in a portion of the illustrated surface to simplify the drawing and ensure that the figures are clear. The embossment is of course distributed over the entire surface.

FIG. 1b shows a sectional view from FIG. 1a, illustrating a possible variation in which an embossment 7 is arranged on the upper 5 and lower 6 surface. According to a possible development, an offset 17 is provided between the two embossments 7 on both surfaces 5, 6, wherein only one offset 17 can be shown in the direction of the longitudinal extent 2 for presentation reasons. However, it is also possible for there to be no offset 17 between the two embossments 7, and both embossments 7 are thus arranged on the surfaces 5, 6 such that they are congruent. It is also possible to find that two different embossments 7 are often arranged on both surfaces 5, 6, and in particular for the embossing impressions 8 on the upper surface to differ from those on the lower 6 surface. It is also possible for the embossing impressions 8 to additionally or alternatively be arranged such that they are pivoted by an angle in relation to the longitudinal extent.

FIG. 2 shows another possible embodiment of the plastic object 1 according to the invention with an embossment 7 applied to an upper surface 5, wherein the embossment 7 is formed by embossing impressions 8 distributed in a regular pattern over the surface 5. According to this embodiment, the embossing impressions have a boundary line 12, said boundary line 12 being circular in shape. The diameter of the embossing impression 8 is in the region of 0.8 mm to 1.6 mm, but a diameter of 0.89 mm or 1.42 mm is preferred.

The individual embossing impressions 8 of the embossment 7 are in turn distributed evenly over the upper surface 5 and form columns and rows in the arrangement. In this case, the individual columns are arranged in a column spacing 13 or a row spacing 14 of two consecutive rows with the same column orientation. According to the preferred embodiments, the combination of column spacing and row spacing is 1.23/2.49 mm and 1.80/3.62 mm.

To ensure that the embossing impressions 8 are packed as compactly as possible to form the embossment 7, it is also conceivable according to this embodiment that there should be a column offset 15 between adjacent columns of a row, and/or a row offset 16 between adjacently arranged rows of a column. It is preferable if this column offset 15 or row offset is 50% of the diameter of the embossing impression 8.

FIGS. 1a and 2 each show a top view of the embossing impressions 8, but the flanks of the embossing impressions 8 are not shown for reasons of simplicity. These flanks are visible in the sectional view in FIG. 1b. The specified preferred diameters of 0.89 mm for a fine embossment and 1.42 mm for a coarse embossment thus correspond to the diameter of the embossing impression 8 at the base of the embossment (in the depth of the plastic material). A stamp used to produce an embossing impression 8 may have a trapezoidal cross-section, for example, and has the preferred diameter values of 0.89 mm or 1.42 mm respectively at the tip. A diameter at the base of 1.23 mm or 1.76 mm respectively is obtained if the stamp height is 0.4 mm with a flank angle of 23°. As the embossing stamp and thus the individual stamps, as already described, are never pressed into the plastic strip the full 0.4 mm, the diameters of the embossing impressions 8 on the strip surface (5, 6) are correspondingly smaller and can be calculated by trigonometry if the actual embossing depth is known.

Due to two effects when applying or introducing the embossing impressions 8, the embossing impressions 8 will have an appearance that is slightly out-of-round despite the circular stamps. The plastic strip stretched in the longitudinal direction runs underneath an embossing roller or between two embossing rollers. Due to the stretching process, the stamp pressing into the strip will be able to displace the plastic material more easily in the transverse direction of the strip than in the longitudinal direction. After passing through, when the stamp is removed, it is possible to see in the longitudinal direction that there is a slight backwards movement of the plastic material, with the result that the circular embossed embossing impression 8 remains as a slightly oval shape.

The second effect is identified as a relaxation of the stretched plastic strip. The plastic strip runs through the embossing device under considerable tension in some cases. When this tensile stress no longer applies, e.g. after leaving the manufacturing device or due to a slight heating process which may in some cases be applied after the first process, this causes the plastic strip to contract, principally in the longitudinal direction. This contraction may be as much as 3-12%, which will in turn lead to a deformation (compression in the longitudinal direction) of the circular embossment.

These advantageous embodiments ensure that there is very good force transference from a clamping device to the plastic strip, wherein this force transference or application of force acts primarily in the direction of the longitudinal extent. At the same time it is also possible to guarantee that an adequate force or kinetic energy can be transferred from the welding device onto the plastic object in order to reliably perform the welding process, usually friction welding. Thus, a strip-shaped plastic object is advantageously created, said object being particularly well adapted or optimized to the requirements in everyday use.

Finally, it is noted that the same components are provided with the same reference numerals or the same component names in embodiments with different descriptions, which means that the disclosures contained in the description as a whole can be transferred accordingly to the same components with the same reference numerals or the same component names. Location information selected in the description, such as, for example, above, below, at the side of, etc, also refers to the figure immediately described and illustrated, and this location information should be transferred accordingly to the new location if this location changes.

FIG. 2 shows another, possibly independent embodiment of the strip-shaped plastic object, again using the same reference numerals or component names as used in FIG. 1 above for the same parts. In order to avoid unnecessary repetitions, reference is made to the detailed description in FIG. 1 above.

The embodiments illustrate possible variations of the plastic strip according to the invention, with the proviso that the invention is not restricted to the variations of these embodiments specifically described, but that various combinations of the individual variations of the embodiments are also possible and these possible variations lie within the abilities of persons skilled in the art in this technical field on the grounds of teaching in relation to technical possibilities posed by the present invention.

Individual features or combinations of features from the different illustrated and described embodiments may also represent independent inventive solutions, or solutions according to the invention.

The object forming the basis for the independent inventive solutions may be taken from the description.

All information relating to ranges of values in the description of the invention should be understood as including any and all partial regions of these ranges, e.g. specifying 1 to 10 should be understood to mean that all partial ranges from the lower limit of 1 and the upper limit of 10 are included, i.e. all partial ranges begin with a lower limit of 1 or higher, and end with an upper limit of 10 or lower, e.g. 1 to 1.7, or 3.2 to 8.1, or 5.5 to 10.

Above all, the individual embodiments illustrated in the figures may constitute the object of independent solutions according to the invention. The related objects and solutions according to the invention can be found in the detailed descriptions of these figures.

Finally, as a matter of form, it should be noted that the strip-shaped plastic object or its component parts is/are sometimes not shown to scale and/or may be enlarged and/or reduced in size to facilitate understanding of the structure of the strip-shaped plastic object.

LIST OF REFERENCE NUMERALS 1 plastic object
2 longitudinal extent
3 strip width
4 strip thickness
5 upper surface
6 lower surface
7 embossment
8 embossing impression
9 length
10 width
11 depth
12 boundary line
13 column spacing
14 row spacing
15 column offset
16 row offset
17 offset

The invention claimed is:

1. A plastic strip (1), having a longitudinal extent (2) and, perpendicular thereto, a strip width (3) and a strip thickness (4),
wherein the plastic strip (I) comprises a partially crystalline, thermoplastic plastic material,
which is stretched monoaxially in the direction of the longitudinal extent (2), and
wherein the plastic strip (1), when viewed in the direction of the longitudinal extent (2) and in the direction of the strip width (3), has a continuous cross-section in each case, and wherein the strip width (3) and the longitudinal extent (2) form an upper (5) and a lower surface (6), which surfaces (5, 6) are spaced apart from each other by the strip thickness (4), and
wherein at least one of the surfaces (5, 6) has an embossment (7), said embossment (7) being formed by embossing impressions (8) distributed over the strip width (3) and over the longitudinal extent (2), said distributed embossing impressions (8) of the embossment (7) forming columns in the direction of the longitudinal extent (2) and rows in the direction of the strip width (3),
wherein
in a top view of the embossing impression (8), the boundary line thereof is formed by a closed oval curve,
the embossing impression (8) has a length (9), a width (10), and a depth (11) extending in the direction of the strip width (4), wherein viewed in the longitudinal extent (2), a row spacing (14) between two consecutively arranged embossing impressions (8) is 2 to 2.5 times the length (9) of the embossing impression (8), and viewed in the band width (3), a column spacing (13) between two adjacently arranged embossing impressions (8) is less than or equal to twice the width (10) of the embossing impression (8).

2. The plastic strip according to claim 1, wherein the boundary line (12) of the embossing impression (8) is elliptical or oval.

3. The plastic strip according to claim 2, wherein the length (9) of the embossing is in the region of 1.0 mm-2.8 mm and the width (10) of the embossing is in the region of 0.5 mm-1.2 mm.

4. The plastic strip according to claim 1, wherein the boundary line (12) of the embossing impression (8) is circular.

5. The plastic strip according to claim 4, wherein the diameter (18) of the embossing impression (8) is in the region of 0.8 mm-1.6 mm.

6. The plastic strip according to claim 1, wherein the length (9) of the embossing impression (8) is oriented in the direction of the longitudinal extent (2) and the width (10) of the embossing impression (8) is oriented in the direction of the strip width (3).

7. The plastic strip according to claim 1, wherein the orientation of the columns is pivoted by an angle in relation to the longitudinal extent (2) and/or the orientation of the rows is pivoted by an angle in relation to the strip width (3).

8. The plastic strip according to claim 1, wherein a column offset (15) and a row offset (16) are provided between consecutively arranged rows when viewed in the direction of the longitudinal extent (2).

9. The plastic strip according to claim 1, wherein the depth (11) of the embossing impression (8) is in the region of 50 µm- 300 µm.

10. The plastic strip according to claim 1, wherein both surfaces (5, 6) comprise an embossment (7).

11. The plastic strip according to claim 10, wherein the embossment (7) is different on both surfaces.

12. The plastic strip according to claim 10, wherein, in the top view of the plastic strip (1), an offset is provided in the direction of the longitudinal extent (2) and/or an offset is provided in the direction of the strip width (3) between the embossment (7) on both surfaces (5, 6).

13. The plastic strip according to claim 12, wherein the offset is 50% of the column spacing (13) and/or 50% of the row spacing (14).

14. The plastic strip according to claim 10, wherein, in the top view of the plastic strip (1), the orientation of both embossments (7) is pivoted by an angle in relation to one another.

15. The plastic strip according to claim 14, wherein the angle is 90° and the embossing impressions (8) of both embossments (7) are designed such that, if both embossments (7) are arranged without pivoting, they coincide with respect to their length (9) and width (10), and/or their width (10) and diameter respectively.

16. The plastic strip according to claim 1, wherein the boundary line (12) is made up of straight sections and/or different curve radii.

* * * * *